Figure 1:
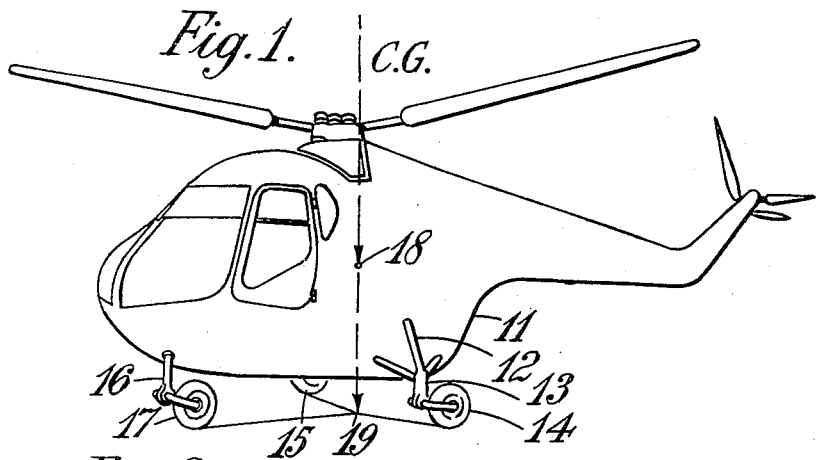

March 29, 1960  G. ORLOFF  2,930,609
SHOCK ABSORBERS FOR AIRCRAFT
Filed June 13, 1956  5 Sheets-Sheet 1

INVENTOR
GEORGE ORLOFF

By

Watson, Cole, Grindle & Watson
ATTORNEYS

March 29, 1960   G. ORLOFF   2,930,609
SHOCK ABSORBERS FOR AIRCRAFT
Filed June 13, 1956   5 Sheets-Sheet 3

Inventor: George Orloff
By: Watson, Cole, Grindle & Watson
Attys

March 29, 1960  G. ORLOFF  2,930,609
SHOCK ABSORBERS FOR AIRCRAFT
Filed June 13, 1956  5 Sheets-Sheet 5

Inventor:
George Orloff
By: Watson, Cole, Grindle & Watson
Attys

United States Patent Office 2,930,609
Patented Mar. 29, 1960

2,930,609

SHOCK ABSORBERS FOR AIRCRAFT

George Orloff, Gloucester, England, assignor to British Messier Limited, Gloucester, England, a British company Application June 13, 1956, Serial No. 591,037

Claims priority, application Great Britain June 14, 1955

19 Claims. (Cl. 267—64)

This invention comprises improvements in or relating to shock absorbers for aircraft.

The invention is concerned with "hydraulic-pneumatic spring" and "hydraulic spring" shock absorbers of the kind (hereinafter referred to as the kind described) comprising a cylinder closed at one end, a ram or piston to slide within the cylinder and having a hollow ram-rod closed at its end remote from the ram and extending to the exterior of the cylinder through the end of the cylinder opposite the closed end, and valve means controlling flow through a passage in the ram which connects the interior of the hollow rod with the cylinder chamber on the other side of the ram.

The invention is especially applicable to such shock absorbers when they are arranged to operate in undercarriages for helicopters and other naval carrier-borne aircraft, but it is not limited to this application.

The said chamber in the cylinder is filled with a liquid, such as oil, while the interior of the hollow rod in the "hydraulic-pneumatic springs" type of shock absorber is only partially filled therewith, the remaining volume being charged with a compressed gas, such as air, at a suitable pressure so that the liquid in the interior of the hollow rod is subject to the pressure of the gas and normally maintains closed the valve means in the ram. In the "hydraulic spring" type, the interior of the hollow rod is completely filled with liquid. When the cylinder is displaced with respect to the ram so as to put the liquid in the chamber under sufficient pressure the valve means in the ram is opened so that this pressure is transmitted to the liquid in the interior of the hollow rod. Thus damping of shock loading may be afforded through the valve means by the transfer of the liquid from one side of the ram to the other.

When a helicopter or other aircraft is parked on the deck of an aircraft carrier, the rolling of the ship results in undesirable bouncing of the aircraft due to the degree of resilience afforded by the shock absorbers in each of the undercarriage legs. In order to overcome this it has hitherto been proposed to temporarily lock the shock absorber in the position it adopts when the aircraft is resting on the deck so that it acts as a fixed strut and the aircraft consequently has a rolling frequency which approximates to the motion of the carrier. Such locking is effected mechanically in any convenient manner. With this arrangement it is necessary to break the temporary lock prior to flight so that during take-off and landing the shock absorber can operate normally.

However, a serious disadvantage with the above arrangement is that when the aircraft carrier enters rough water the rolling frequency of the parked aircraft becomes excessive and may result in serious damage to it. A certain degree of damping is very desirable in the undercarriage under these conditions, and it is an object of the invention to provide for this.

According to the present invention, in a shock absorber of the kind described the valve means is biassed, under normal static loading, into the closed position to maintain a condition of hydraulic lock between the interior of the hollow rod and the cylinder chamber, and means are provided which automatically effect release of the hydraulic lock when the acceleration of the shock absorber as a whole in the axial direction exceeds a predetermined value.

In the preferred form, inertia-operated means is operatively-connected with said valve means whereby when the axial acceleration exceeds a predetermined value the valve means is actuated by the inertia-operated means to release the hydraulic lock by opening communication between the cylinder chamber and the interior of the hollow rod.

The inertia-operated means may comprise an acceleration-sensitive mass carried by the ram and movable with respect thereto in the axial direction. Said acceleration-sensitive mass can be slidable in a bore in the ram, or pivotally mounted on its exterior or within the hollow rod which is secured to or integral with the ram.

A shock absorber of this nature can be incorporated in an aircraft undercarriage in an arrangement such that when the vertical acceleration of the aircraft in the upward sense exceeds a predetermined value the hydraulic lock in the shock absorber is released.

Figure 2:
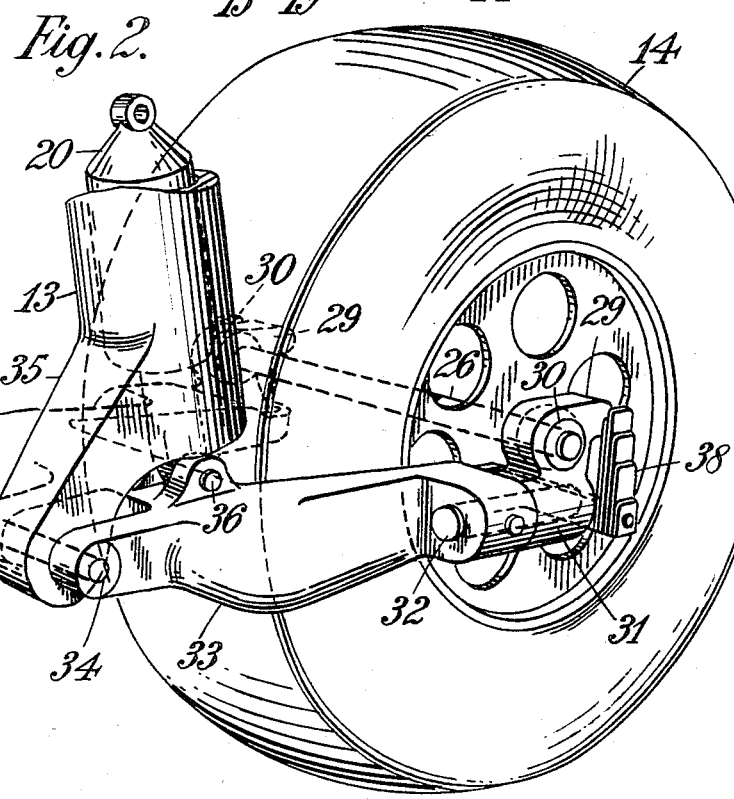
Figure 3:
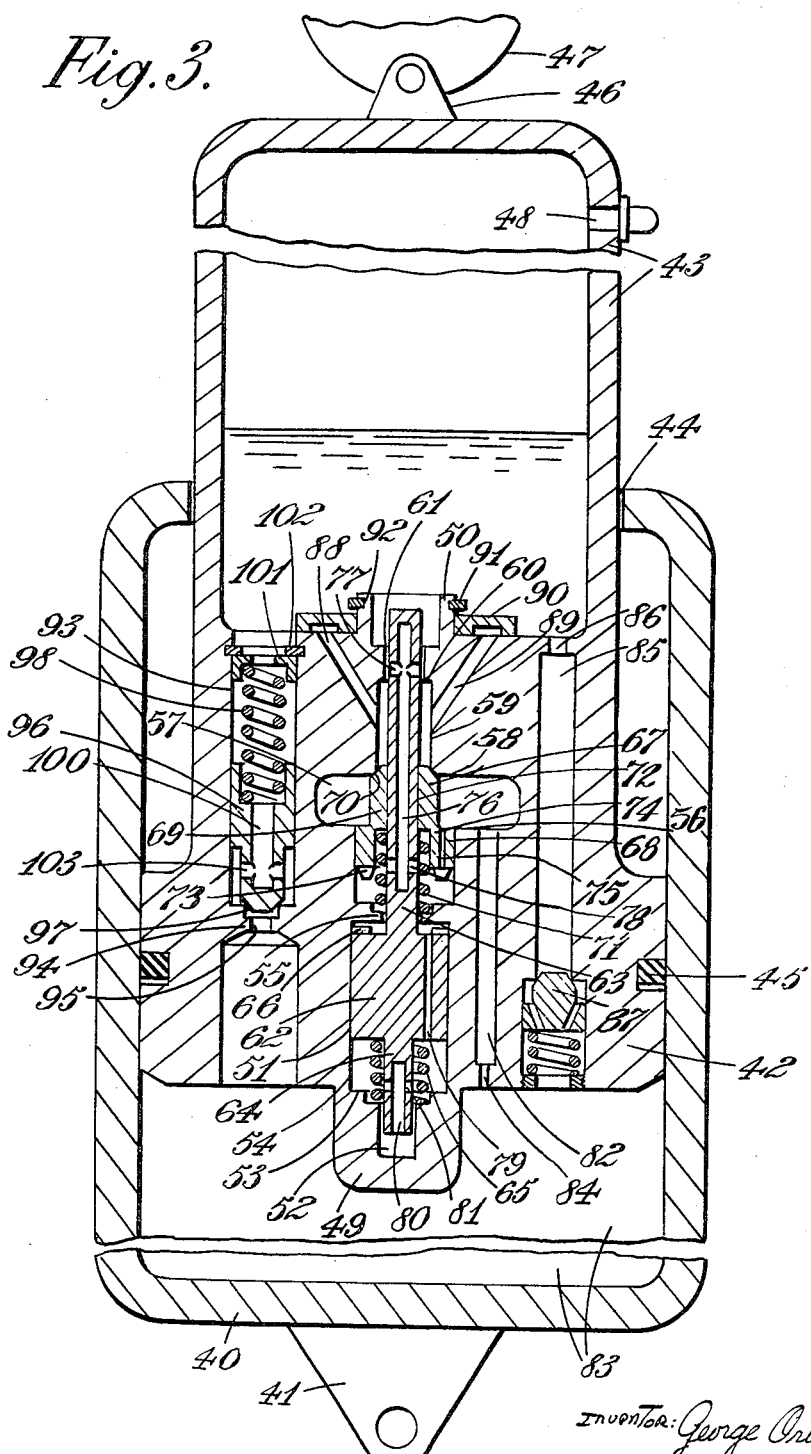
Figure 4:
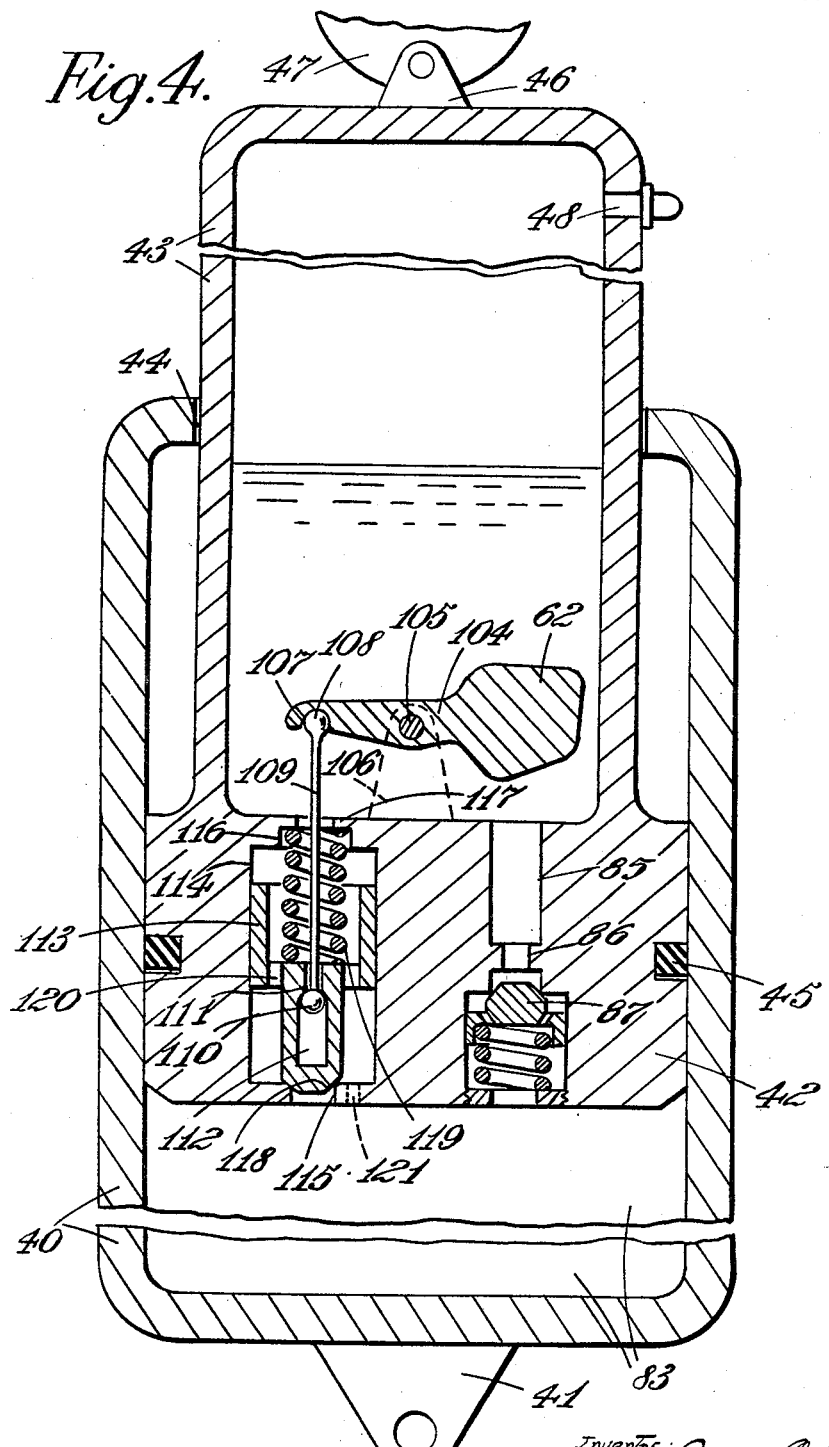
Figure 5:
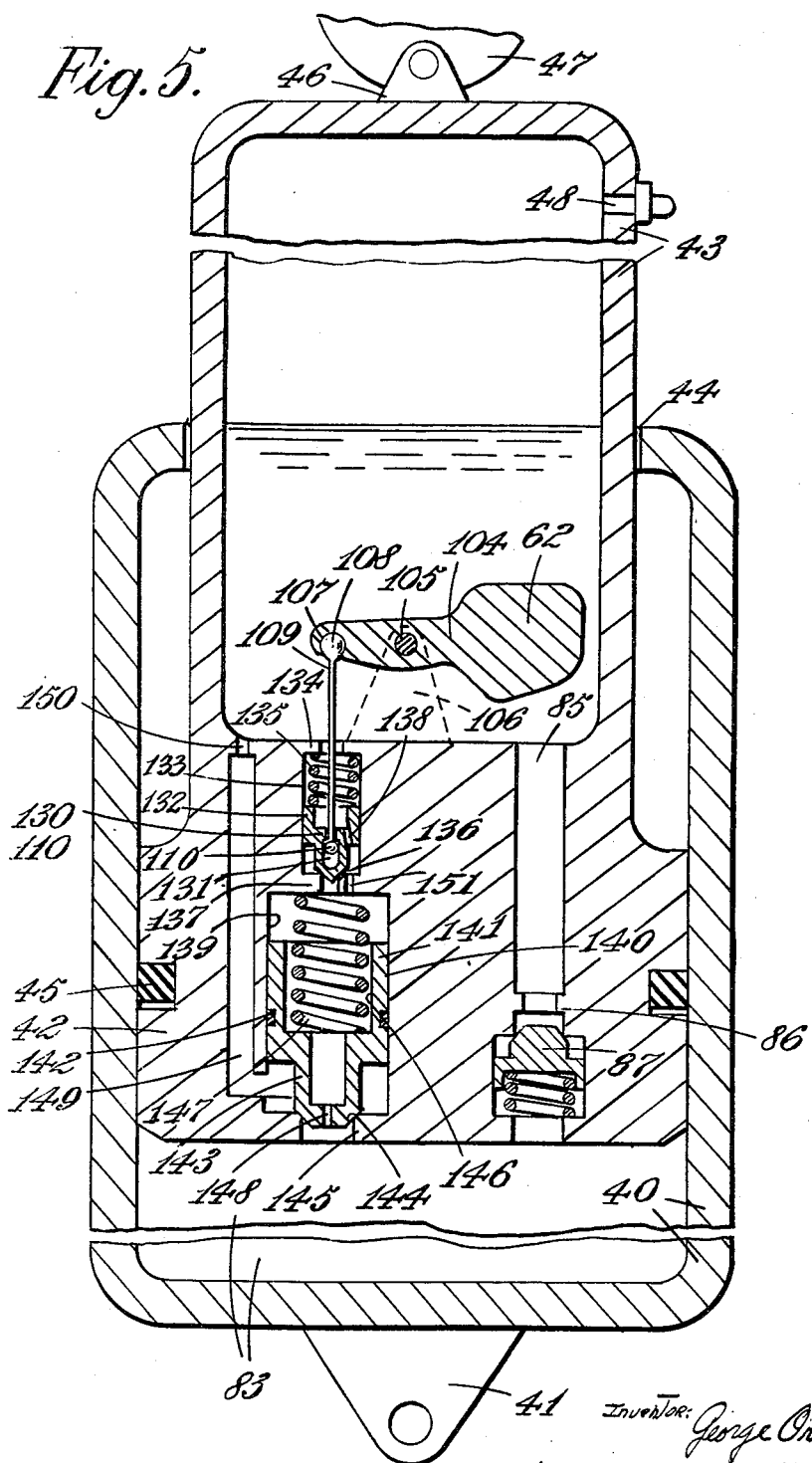
Figure 6:
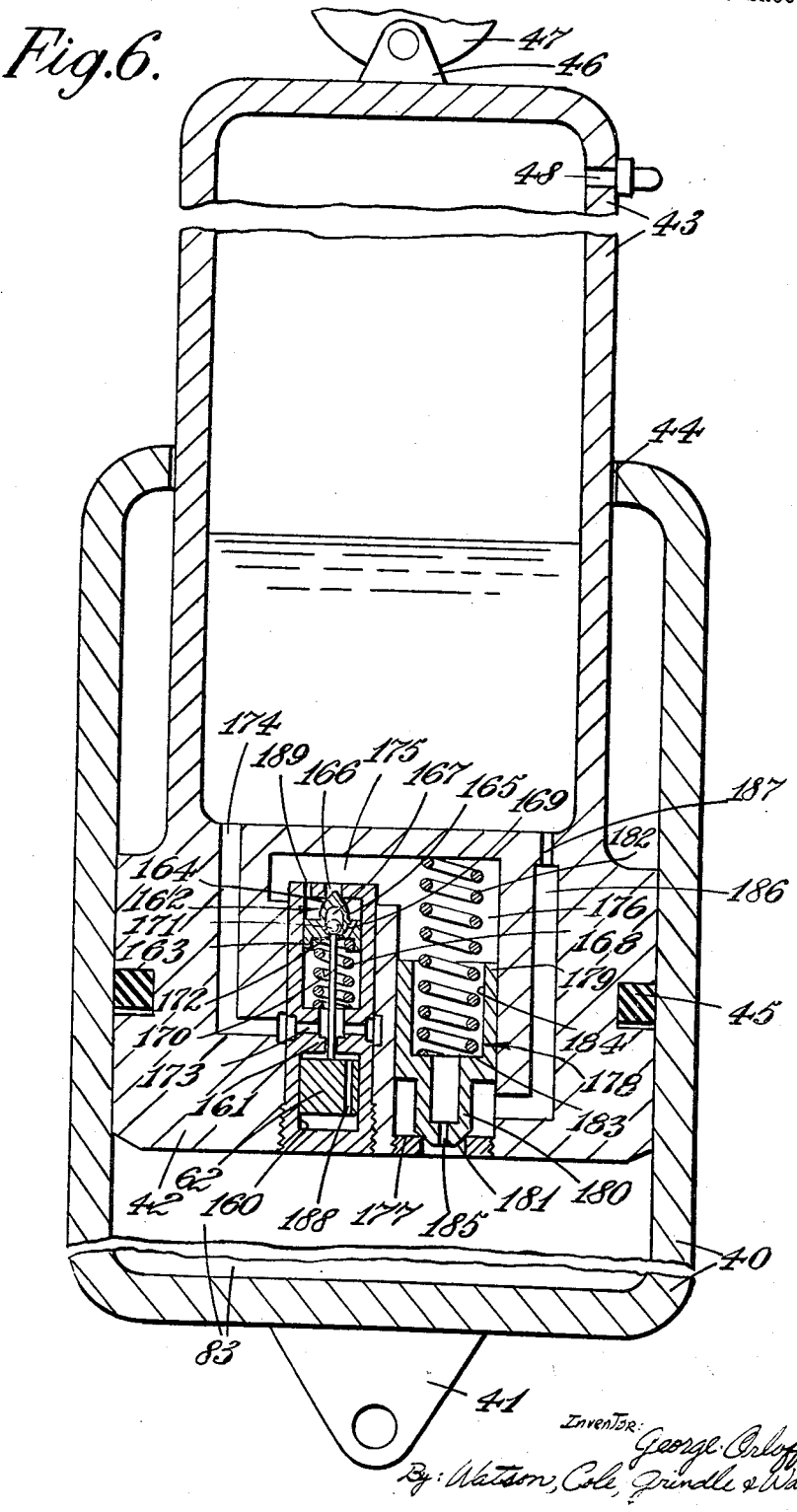

The following is a description by way of example of certain embodiments of the present invention, reference being made to the accompanying diagrammatic drawings in which:

Figure 1 is a perspective view of a helicopter to the undercarriage of which shock absorbers in accordance with the invention may be fitted, Figure 2 is a perspective view of the undercarriage mounting including the ground wheel and a shock absorber according to this invention, Figure 3 shows in cross-section one form of shock absorber construction according to the invention, Figure 4 shows in cross-section another form of shock absorber construction, Figure 5 shows in cross-section a third shock absorber construction, and Figure 6 shows in cross-section a fourth shock absorber construction.

Referring to Figure 1, the helicopter fuselage 11 carries brackets 12 at each side on which are secured shock absorber mountings 13 for two lateral ground wheels 14, 15. There is a similar but lighter mounting 16 for a front ground wheel 17. The centre of gravity of the helicopter is indicated at 18 and is above a point 19 on the ground which lies between the wheels 14, 15 but somewhat in front of the line joining them. Thus the wheels are grouped about the centre of gravity.

Figure 2 shows one of the undercarriage mountings in greater detail, comprising the outer leg casing 13 which is mounted on the bracket 12 shown in Figure 1 and contains a shock absorber 20. In Figure 2 the leg 13 has been shown broken away to permit the shock absorber 20 to be seen. The wheel 14 runs on a stationary axle 26 which is supported at its ends in ears 29 by means of spherical bushes 30. The ears 29 are formed by the upper parts of wheel bearing members 31 which are supported on pins 32 in the arms of a trailing fork lever 33. This fork lever is pivoted at 34 at its forward end to a forward projection 35 upon the lower end of the shock absorber leg 13, and the lower end of the cylinder of the shock absorber is pivotally connected at 36 to the lever 33 and the wheel 14. The wheel-bearing members 31 and spherical bushes 30 which support the axle 26, permit a certain lateral movement of the ground wheel 14 relative to the lever 33 by reason of the pins 32 being able to turn in the arms of the lever 33. This movement is limited by laminated leaf springs 38 which are supported on rearward extensions of the arms of the lever 33 and which stand up on the outside of each of the ears 29 of the wheel-bearing members 31 and prevent them rocking over too far. Such freedom of lateral movement of the ground wheel 14 relative to the shock absorber assists in preventing the development of periodic vibrations of the helicopter body relatively to its undercarriage.

Referring to Figure 3, one form of shock absorber construction according to the invention comprises a cylinder 40 the lower end of which is closed and provided with a suitable projection 41 by which it is pivotally connected at 36 to the lever 33 (see Figure 2). A ram 42 is slidingly mounted within the cylinder and a hollow member 43 which is integral with the ram extends to the exterior of the cylinder through an aperture 44 provided in the upper end of the cylinder. The ram itself is provided with a sealing ring 45 fitted in a suitable groove. The hollow member 43 is provided at its upper extremity with a projection 46 by means of which it is attached to the fixed part 47 of the undercarriage structure. The hollow member is filled to a certain level with a liquid, such as oil, and above this level is charged with compressed air to a desired pressure through a pressurising connection 48 near the upper end of the member.

The lower face of the ram is provided with a stub extension 49, coaxial therewith but of smaller diameter, while at the upper end it is provided with an open cylindrical extension 50 also coaxial with the ram and of smaller diameter than the interior of the hollow member 43 into which it projects.

The ram itself is provided with a coaxial bore 51 which opens at its upper end into the open cylindrical extension 50, and at its lower end extends partway into the stub extension 49. The bore 51 is of relatively small diameter at its lower end 52, but is stepped at 53 to a larger diameter. This larger part 54 of the bore extends upwardly for about half the total length of the bore, and about two thirds of the way up is provided with an inwardly projecting shoulder or waist 55. At the upper end of the part 54, the bore 51 is stepped at 56 to a still larger diameter to provide an annular chamber 57. Above the annular chamber 57, the bore is stepped in again at 58 to form a part 59 which is somewhat smaller in diameter than the part 54 of the bore. Part 59 continues for a short distance, and the bore is then stepped in at 60 to a part 61 which is approximately of the same diameter as the lower end 52 of the bore, and opens into the cylindrical extension 50.

That part 54 of the bore 51 below the waist or shoulder 55 houses an acceleration-sensitive mass 62 slidable therein, and having integral with it rod-like extensions 63 and 64 at either end respectively. The upper extension 63 extends through the bore 51 to the uppermost part 61 thereof in which it is a sliding fit, while the lower extension 64 extends into the lowermost part 52 of the bore, in which it is likewise a sliding fit. A coil spring 65 is interposed between the underside of the mass 62 and the step 53. Castellated projections 66 are provided on the upper face of the mass 62 around the periphery thereof.

That part 54 of the bore 51 above the shoulder 55 houses a stepped piston-valve member 67, the larger diameter portion 68 of which is slidable within said part 54 of the bore. The smaller diameter portion 69 of the member 67 is above the portion 68, and its upper end is chamfered as at 70 and normally seats upon the step 58, being urged against it by a coil spring 71 which is interposed between the valve member 67 and the upper side of the shoulder 55. The valve member 67 is provided with a bore 72 through which the upper rod extension 63 of the mass 62 passes slidably. The lower face of the valve member 67 is provided with castellated projections 73. In the larger diameter portion 68 of the valve member, there is provided at the step face an orifice 74 which opens into a passage 75 which in turn opens between two or more of the castellated projections 73, to the space below the valve member.

The upper rod extension 63 of the mass 62 is provided with a bore 76, and radial ports 77 near the upper end thereof and further radial ports 78 near the lower end thereof may place this bore in communication with the chambers surrounding its ends. A passage 79 of small diameter in the mass 62 leads from the lower to the upper face thereof. The lower rod extension 64 is also provided with a bore 80 which is open at its lower end and which is in communication with the space in the part 54 of the bore 51 surrounding this extension through radial ports 81.

A passage 82 provided in the ram with its axis parallel to that of the ram places the cylinder chamber 83 beneath the ram in communication with the annular chamber 57. At its lower end this passage 82 is provided with a flow restriction 84. A second passage 85 in the ram extends between the interior of the hollow rod 43 and the chamber 83. At its upper end this passage 85 is provided with a restriction 86, while at its lower end it is provided with a non-return valve 87. Two passages 88 and 89 in the ram lead from the part 59 of the bore 51 to the interior of the hollow rod 43. A common non-return valve 90 in the form of a channel-sectioned ring closes these passages at their upper ends. The non-return valve 90 is slidingly mounted on the cylindrical extension 50 and its upward movement is limited by a circlip 91 or the like fitted in a groove 92 in this extension.

A further bore 93 is provided in the ram, this extending from the chamber 83 to the interior of the hollow rod 43 and being provided with an inwardly projecting shoulder or waist 94 intermediate its ends. An orifice 95 is fitted in this waist 94. The upper part of the bore 93 above the waist houses a safety piston-valve member 96 which is stepped in diameter, the upper part of larger diameter being a sliding fit in the bore and the lower part of smaller diameter having its lower face chamfered at 97. This chamfered part is normally urged against the upper side of the waist or shoulder 94 by a coil spring 98 interposed between the piston-valve member 96 and a ring member 101 which is retained in the upper end of the bore 93 by a circlip 102. Radial ports 103 in the smaller diameter part of the piston-valve member 96 place a bore 100 therein in communication with the space surrounding said smaller diameter part, and the upper end of the bore 100 opens into the space in the bore 93 above the valve member.

The operation of the shock absorber will now be described:

When the aircraft is resting, for example, on the deck of an aircraft carrier and the degree of rolling of the carrier is not excessive, the shock absorber is hydraulically locked to act as a strut in the following manner. Liquid from the chamber 83 is present also in the passage 82, the annular chamber 57, the orifice 74, the passage 75 and in the space at the underside of the piston-valve member 67. From this space liquid passes through the ports 78 into the bore 76, and also through the passage 79 in the mass 62 to the space at the underside of the mass and through the ports 81 into the bore 80. Under these conditions the piston-valve member 67 is held on its seating and the mass 62 is held in its uppermost position by the effort of coil springs 71 and 65, respectively and due to the weight of the aircraft which is exerted on the liquid in the chamber 83.

When however the degree of rolling of the aircraft carrier becomes excessive, the mass 62, upon increased upward acceleration of the aircraft, moves downwardly in the ram due to its inertia, against the effort of the coil spring 65. The liquid thus displaced passes through the passage 79 to the upper side of the mass 62. Downward movement of the mass results in the opening of the ports 77 in the upper rod extension 63 to the part 59 of the bore 51. Consequently the pressure built up at the underside of the piston-valve member 67 is released, the liquid flowing through the ports 78, the bore 76 and the ports 77 into the part 59 of the bore 51, and into the channels 88 and 89. Such release of pressure unbalances the piston-valve member 67 and the pressure in the annular chamber 57 overcomes the effort of the coil spring 71 and moves the valve member away from its seating at 58. The liquid in the annular chamber 57 can then pass through the part 59 of bore 51, the passages 88 and 89 and the non-return valve 90 into the interior of the hollow member 43. The hydraulic lock is thus released, any necessary damping being effected within the hollow member and through the restriction 84 in passage 82.

On recoil, the piston-valve member 67 and the mass 62 move back to their uppermost positions and the non-return valve 90 closes. Liquid flows back into the chamber 83 through the recoil passage 85 and the non-return valve 87, the rate of recoil being controlled by the restriction 86.

If for any reason the mass 62 becomes jammed or the piston-valve member 67 fails to open, the safety valve member 96 opens when a safe maximum pressure is exceeded. Thus when the chamfered part 97 moves away from its seating liquid passes from the chamber 83 through the orifice 95, the ports 103 and the bore 100 into the interior of the hollow rod 43. Damping is then effected within the hollow rod and by the orifice 95.

When the degree of rolling of the aircraft carrier decreases again the shock absorber becomes hydraulically locked as before.

When the aircraft is in flight the shock absorber will of course be hydraulically locked in the fully extended position. On the wheels touching the ground, or aircraft deck, the consequent upward acceleration imparted to the undercarriage causes the mass 62 to move downwardly to initiate instantaneous release of the hydraulic lock so that the shock absorber can immediately operate normally to damp out the landing loads.

Figure 4 shows an alternative construction in which a mass 62 is carried on an arm 104 fixed thereto, which arm is pivoted at 105 on a projection 106 on the ram within the interior of the hollow member 43. The end of the arm opposite to the mass is provided with a ball socket 107 into which fits the ball end 108 of a rod 109. The other end of this rod is also ball-shaped at 110 and engages the underside of a shoulder 111 in a bore 112 of a stepped piston-valve member 113. The piston-valve member slides within a bore 114 in the ram 42, and this bore is stepped in once at its lower end to a smaller diameter 115, and twice at its upper end to two smaller diameters 116 and 117. The lower part of the piston valve member 113 which is of smaller diameter has its lower end chamfered at 118, this end being urged by a coil spring 119 against the seating provided at the step down to the smaller diameter part 115 of the bore 114. The spring 119 is interposed between the shoulder 111 on the valve member and the step between the two parts 116 and 117 of the bore 114. Axial ports 120 are provided through the step of the piston-valve member and thus place the space surrounding the smaller diameter lower part thereof in communication with the upper part of the bore 114. The bore 112 in the valve member 113 extends some way below the shoulder 111 so that the valve member can move upwardly away from its seat even when the rod 109 is in its lowermost position. A jet 121 may be incorporated in the ram 42 to place the chamber 83 and the space in the bore 114 surrounding the lower part of the piston-valve member in "bleed" communication if so desired.

As in Figure 3, a recoil passage 85 with a restriction 86 and a non-return valve 87 is provided in the ram.

In operation, with the aircraft on the ground or deck, locking of the shock absorber is afforded by the effort of the coil spring 119 and the pressure of the liquid in the interior of the hollow member 43 holding the valve member 113 shut. These may be further assisted by pressure liquid bled through jet 121 and ports 120 to either side of the piston-valve member 113. Since the effective upper face area of the piston-valve member is greater than the lower, this pressure results in a differential across the piston-valve member biassing it to the closed position.

Under excessive upward acceleration the mass 62 moves downwardly about its pivot 105, and the rod 109 in moving upwardly, overcomes the pressure differential and spring acting on the piston-valve member and lifts it so that the conical part 118 moves away from its seating. Thus the hydraulic lock is released and damping is effected through the ports 120 and in the liquid in the interior of the hollow member. Recoil occurs in the manner described with reference to Figure 3.

If for some reason the mass 62 does not function properly, for example due to jamming of the pivot, the piston-valve member 113 will act as a safety valve when the pressure in the chamber 83 exceeds a predetermined value. As previously explained the piston-valve member is capable of upward movement when the rod 109 is in its lowermost position.

Figure 5 shows another construction in which, as in Figure 4, a mass 62 is carried on an arm 104, which arm is pivoted at 105 on a projection 106 on the ram within the interior of the hollow member 43. That end of the arm opposite to the mass is provided with a ball socket 107 into which fits the ball end 108 of a rod 109. The other end of this rod is also ball shaped at 110 and engages the underside of an inwardly-extending shoulder 130 in the bore 131 of a stepped piston-type first-stage or pilot valve 132. This valve is housed in a bore 133 incorporated in the ram 42, which bore is provided with an inwardly-projecting shoulder 134 at its upper end and there opens into the interior of the hollow member 43. The rod 109 is coaxial with this bore 133. A coil spring 135 interposed between the shoulder 134 and the upper face of the pilot valve 132 assists in urging the conical lower end 136 of this valve against a seating formed by a further inwardly-projecting shoulder 137 at the lower end of the bore 133. The lower part of the valve 132 is of smaller diameter than the upper part and a small port (or ports) 138 places the space surrounding this lower part in communication with the upper part of the bore 133.

The bore 133 opens at its lower end beyond the shoulder 137 into a larger bore 139, coaxial therewith, which houses a stepped second-stage or main piston-valve member 140 the upper larger diameter part 141 of which slides within the bore and is provided with a sealing ring 142. The lower edge of the lower smaller diameter part 143 of this main valve member is chamfered at 144 and this chamfer seats against the upper edge of an inwardly-projecting shoulder 145 at the lower end of the bore 139 where said bore opens into the cylinder chamber 83. The valve member 140 is provided with an internal bore 146, and a coil spring 147 is interposed between a shoulder in the bore and the upper end of the bore 139. An orifice 148 is provided at the lower end of the bore 146 to provide communication with the chamber 83 below the ram 42.

From the space surrounding the smaller diameter part 143 of the main valve member 140, a passage 149 leads to the interior of the hollow member 43. A restriction 150 is provided in this passage. A by-pass passage 151 of small diameter in the shoulder 137 extends between the bore 139 and the space in the bore 133 surrounding the lower smaller diameter part of the pilot valve 132. As in Figures 3 and 4 a recoil passage 85 with a restriction 86 and a non-return valve 87 is also provided in the ram 42.

In operation, hydraulic locking is maintained in the following manner. Liquid pressure from the chamber 83 passes through the orifice 148 to the upper faces of the main valve member 140, through the passage 151 to the underside of the pilot valve 132 and through the port or ports 138 to the upper side of said valve 132. The upper side of the pilot valve 132 is also subjected to the pressure of the liquid in the hollow member 43. Thus both valves are maintained in their closed position by the efforts of the coil springs 147 and 135 respectively and the hydraulic pressures acting upon them, as long as the mass 62 remains in its uppermost position. When however the upward acceleration acting upon the undercarriers exceeds a predetermined value, the mass 62 moves downwardly about its pivot 105 and lifts the pilot valve 132. Consequently the pressure build-up above the main valve member 140 is relieved, liquid passing into the bore 133 and through the ports 138 at a desired rate into the hollow member 43. Such release of pressure results in the unbalancing of the main valve member 140 which thus lifts so that the chamfered part 144 thereof moves away from its seating. Liquid from the chamber 83 is then free to pass through the passage 149 into the hollow member 43, damping being effected through the restriction 150 and in the hollow rod.

If the mass 62 jams at its pivot or fails to function properly for any other reason, the main valve member 140 opens at a predetermined maximum allowable pressure in the chamber 83 and thereby acts as a safety valve. Recoil occurs in the manner described with reference to Figures 3 and 4.

Figure 6 shows a further construction in which a mass 62 is slidable in a bore 160, closed at its lower end, which is incorporated in the ram 42. This bore is provided with an inwardly-projecting stepped shoulder or waist 161 and in the part of the bore above it a piston-type pilot valve 162 is housed. The larger diameter lower part 163 of this valve is a sliding fit in the bore while the upper end 164 of the smaller diameter upper part 165 is conical in shape and seats on to the lower edge of a port 166 at the top of the bore and coaxial therewith. The valve 162 is provided with an internal bore 167, and a coil spring 168 is interposed between a shoulder in said bore and the upper side of the shoulder 161 so as to assist in urging the valve on to its seating. A port 169 places the upper and lower sides of the larger diameter part of the pilot valve in communication. A rod-like extension 170 extends from the mass 62 into an upper smaller diameter part of the bore 167 beyond the shoulder on which the spring 168 bears, and a ball end 171 at its upper extremity engages behind a further shoulder 172 formed in this part of the bore. Radial ports 173 in the shoulder 161 lead from the bore 160 to a passage 174 which communicates with the interior of the hollow rod 43. The port 166 opens into a chamber 175 which in turn leads into the upper part of a bore 176, larger in diameter than the bore 160 and parallel with it. A small orifice 189 bypassing the pilot valve is provided at the top of the bore 160 and places the upper end of the bore in communication with the chamber 175. The larger bore 176 is provided with an inwardly-projecting shoulder 177 at its lower end, where it opens into the chamber 83. A stepped piston-type main valve member 178 is housed in this bore 176, the upper part 179 thereof being a sliding fit in the bore while the lower part 180 of smaller diameter has a chamfered part 181 at its lower end. This part 181 is urged against the upper edge of the shoulder 177 by a coil spring 182 which is interposed between the upper closed end of the bore 176 and a shoulder 183 in a bore 184 in the valve member 178. An orifice 185 is provided in the lower end of the valve member. A passage 186 leads from the space surrounding the smaller diameter part 180 of the valve member 178 to the interior of the hollow member 43 and this passage incorporates a restriction 187. A passage 188 in the mass 62 places the upper side in communication with the underside thereof. As in the other constructions the ram 42 is provided with a recoil passage, restriction and non-return valve, but these are not shown in this sectional drawing.

In operation, hydraulic locking is maintained in the following manner. Liquid pressure from the chamber 83 passes through the orifice 185 to the upper faces of the main valve member 178 and through the chamber 175 to the port 166 where it acts upon that part of the conical upper end 164 of the pivot valve 162 which is exposed to it through the port. Liquid pressure also passes through orifice 189 into the upper end of the bore 160. Pressure liquid from the interior of hollow member 43 communicates through the passage 174 and the radial ports 173 with the underside of the pilot valve 162 and the upper face of the mass 62. This liquid also passes through the port 169 to the upperside of the valve 162. The spring 168 and the pressure differential over the pilot valve however maintain it in the closed position until upon excessive upward acceleration of the undercarriage, the mass 62 is displaced downwardly in its bore 160, liquid consequently passing through passage 188 from the underside to the upperside thereof. When this happens the pilot valve 163 opens and the pressure which has built up above this valve and above the main valve member 178 is released, liquid passing through port 166, the port 169, the ports 173, and the passage 174 to the interior of the hollow member 43. The main valve member 178 is thus unbalanced and moves upwardly compressing coil spring 182 and permitting entry of liquid from the chamber 83 into the passage 186 and through the restriction 187 into the interior of the hollow member 43. Thus damping is effected both through the restriction 187 and in the liquid in the interior of the hollow rod.

As described with reference to the three foregoing constructions, recoil occurs through a recoil passage, restriction and nonreturn valve, but these are not shown in the sectional drawing illustrating this particular construction.

If for any reason the pilot valve fails to operate, the main valve member opens at a predetermined maximum allowable pressure in the chamber 83 and thereby acts as a safety valve.

All the constructions hereinbefore described are of the "hydraulic-pneumatic spring" type, but it will be understood that instead they may be modified to the "hydraulic spring" type by filling the interior of the hollow member 43 with liquid and dispensing with the use of compressed air. In this manner damping is effected in this liquid.

I claim:

1. A shock absorber comprising a cylinder closed at one end, a ram to slide within the cylinder, the chamber between said ram and closed end being liquid filled, a hollow ram-member extending from the ram and closed at that end thereof remote from the ram, said hollow member extending to the exterior of the cylinder through the end of the cylinder opposite the closed end and being pressure fluid filled, a passage through the ram connecting said chamber with said hollow member, valve means to control flow through said passage, said valve means being biased into the closed position to maintain a condition of hydraulic lock between the interior of the hollow member and the cylinder chamber, and means to automatically effect release of the hydraulic lock when the acceleration of the shock absorber as a whole in one axial direction exceeds a predetermined value.

2. A shock absorber as claimed in claim 1, wherein the means to automatically effect release of the hydraulic lock comprises an acceleration-sensitive mass carried by the ram and movable with respect thereto in the axial direction.

3. A shock absorber as claimed in claim 2, wherein the valve means comprises a pilot valve and a main valve, said main valve being located in said passage through the ram and being coupled hydraulically to the pilot valve so that opening of the pilot valve produces opening of the main valve, and said pilot valve being arranged for mechanical operation by the movement of the acceleration-sensitive mass with respect to the ram.

4. A shock absorber as claimed in claim 3, wherein the main valve has a control piston having two working faces, one of which working faces is of greater effective area than the other, both said faces being subject to liquid pressure so that the difference in thrust on the two faces due to the differential area tends to urge the valve on to its seat, and the said pilot valve acts on opening to reduce the pressure on the working face of greater area.

5. A shock absorber as claimed in claim 4, having therein a passage in the ram between the greater area side of the control piston of the main valve and the interior of the hollow member, and said pilot valve is in said passage whereby when the shock absorber is under a compression load producing a higher pressure in the cylinder chamber than exists in the hollow member, opening of the pilot valve puts the greater area side of said piston in connection with the lower pressure side of the ram.

6. A shock absorber as claimed in claim 3, wherein the acceleration-sensitive mass is substantially cylindrical and slidable endwise in an axial bore in the ram, and the pilot valve is disposed in a chamber axially in line with said bore and is operated through a pilot valve rod extending between the mass and the pilot valve.

7. A shock absorber as claimed in claim 6, wherein the bore containing the mass is filled with pressure fluid which travels from one end of the mass to the other through a passage therein as the mass slides.

8. A shock absorber as claimed in claim 6, wherein the pilot valve rod has a hollow portion extending slidably into the pilot valve chamber and the pilot valve comprises a port or ports in the wall of said hollow portion of the pilot valve rod and a co-operating land or shoulder of the valve chamber around the rod to obturate and uncover the ports as the rod slides in said pilot valve chamber.

9. A shock absorber as claimed in claim 8, wherein the bore containing the mass, the pilot valve chamber, and the main valve chamber are all axially in line and constitute portions of a common axial bore in the ram having a plurality of different diameters, the main valve is situated between the mass and the pilot valve with the pilot valve rod passing slidably through the main valve and its control piston, and communication between the pilot valve and the portion of the bore on the greater area side of said control piston is established by way of the interior of the hollow portion of the pilot valve rod and a further port or ports in th wall of said rod.

10. A shock absorber as claimed in claim 9 comprising a passage in the ram which by-passes the valve means and a safety valve in the by-pass passage which opens to release the hydraulic lock at a predetermined maximum allowable shock absorber presure in the event of failure of the acceleration-sensitive means to operate.

11. A shock absorber as claimed in claim 5, wherein the valve maintaining the hydraulic lock works in a valve chamber into which open passages leading to the cylinder chamber and the hollow member respectively, and the opening of the passage to the cylinder chamber constitutes the valve seat, whereby in the event of failure of the acceleration-sensitive means to operate the valve opens under direct pressure from the cylinder chamber when the pressure therein reaches a predetermined maximum.

12. A shock absorber as claimed in claim 11, wherein the valve maintaining the hydraulic lock has a control piston one working face of which is of greater effective area than the other, both faces of the piston are subject to liquid pressure with the difference in thrust existing normally on the two faces due to the differential area tending to urge the valve on to its seat, the pressure fluid in the valve chamber acts directly on the smaller-area piston face while the pressure in the hollow member acts on the larger-area face, flow passages are provided through the piston, and the pressure fluid in the cylinder chamber has access to the valve chamber when the valve is closed through a restricted orifice or jet.

13. A shock absorber as claimed in claim 11, wherein the pressure fluid in the valve chamber acts directly on the smaller-area face of the control piston, and the pressure fluid in the cylinder chamber has access to the larger-area face through an orifice in the valve.

14. A shock absorber as claimed in claim 13, wherein the passage between the valve chamber and the hollow member includes a flow restriction.

15. A shock absorber as claimed in claim 2, wherein the acceleration-sensitive mass is carried externally of the ram within the hollow member, being pivotally mounted on the ram with a pivot axis at right angles to the longitudinal axis of the shock absorber and displaced laterally from the centre of gravity of the mass.

16. A shock absorber as claimed in claim 15, wherein the pivotally mounted mass is mechanically linked with the valve maintaining the hydraulic lock, and a lost-motion connection is provided to enable the valve to open without coresponding movement of the mass about its pivot.

17. A shock absorber as claimed in claim 1, wherein a recoil passage is provided through the ram in parallel with the passage in which the valve for maintaining the hydraulic lock is disposed, said passage including a flow restriction and a non-return valve through which liquid is able to flow from the hollow rod to the cylinder chamber upon extension of the shock absorber.

18. A shock absorber comprising a cylinder closed at one end, a ram to slide within the cylinder, the chamber between said ram and said closed end being liquid filled, a hollow ram-member extending from the ram and closed at that end thereof remote from said ram, said hollow member extending to the exterior of said cylinder through the end of said cylinder opposite said closed end and being pressure fluid filled, a valve chamber formed internally of said ram, an inlet to said valve chamber and an outlet from said valve chamber, a first passage in the ram connecting said cylinder chamber with said inlet, a second passage in the ram connecting said outlet with said hollow member, valve means within said valve chamber to control fluid flow through said valve chamber, said valve means comprising a pilot valve and a main valve seating on said outlet, a control piston embodied in said main valve and having two working faces, a restricted passage in said piston, one of said working faces being of greater effective area than the other, the pressure fluid in said valve chamber acting directly on the smaller area face of said control piston and having access to the greater area face of said piston through said restricted passage so that the difference in thrust on the two faces due to the differential area tends to urge the valve on to its seat to maintain a condition of hydraulic lock between the interior of the hollow member and the cylinder chamber, and an acceleration-sensitive mass carried by said ram and axially movable with respect thereto, said pilot valve being arranged for mechanical operation by the movement of said acceleration-sensitive mass with respect to the ram in one axial direction to move into the open position, said pilot valve acting, on opening, to reduce the pressure on the greater area piston working face.

19. A shock absorber as claimed in claim 18, wherein the passage extending from the inlet to the valve chamber to the cylinder chamber has flow restriction means located therein, and the passage extending from the outlet to the valve chamber to the hollow member has a one-way valve located therein.

References Cited in the file of this patent

UNITED STATES PATENTS

| | | |
|---|---|---|
| 1,882,280 | Griswald | Oct. 11, 1932 |
| 2,140,358 | Hanna | Dec. 13, 1938 |
| 2,152,661 | Paton | Apr. 4, 1939 |
| 2,469,912 | Bachman | May 10, 1949 |